Aug. 3, 1943.  H. F. PARKER ET AL  2,325,917
LOAD BRAKE
Filed June 28, 1941
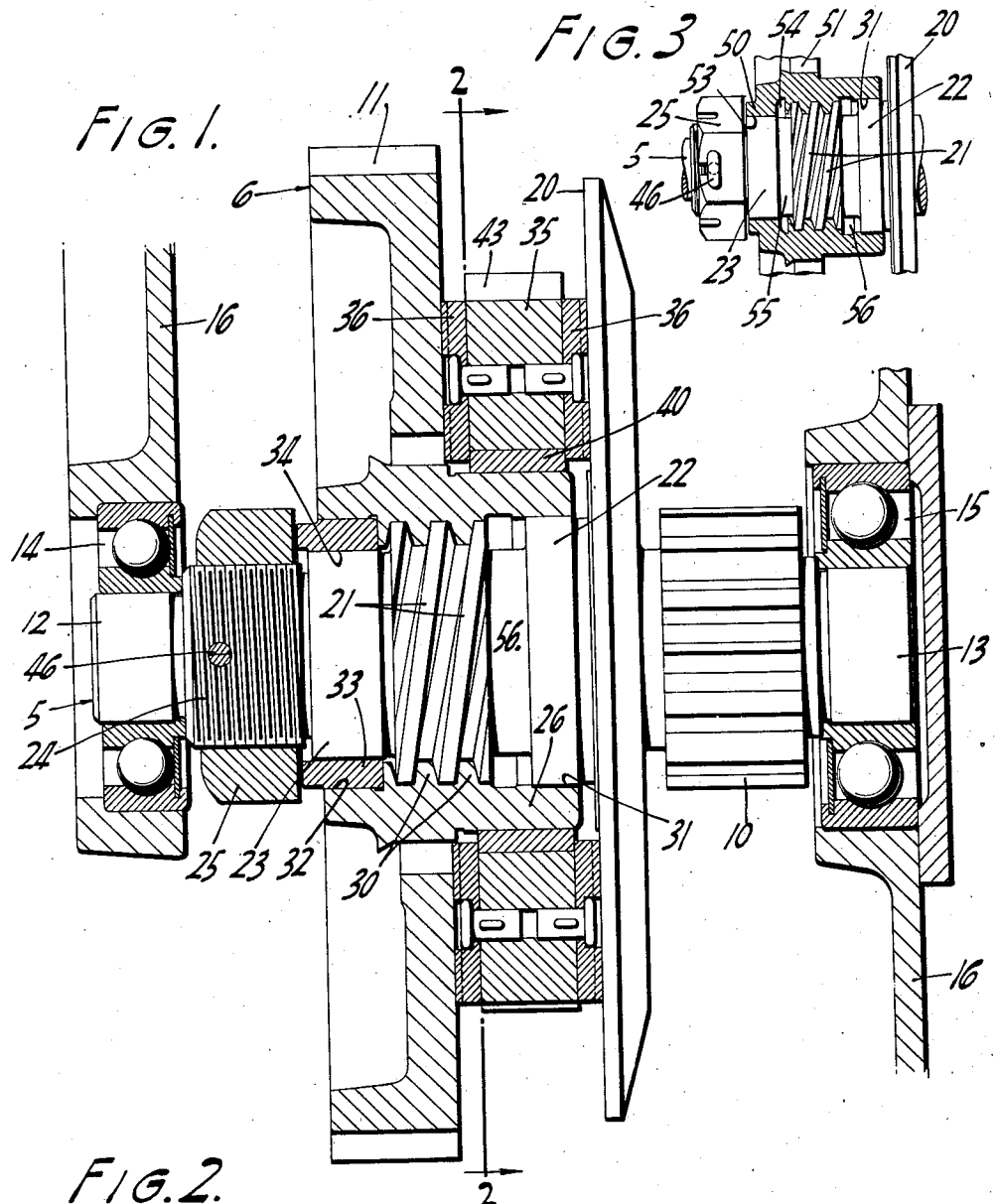
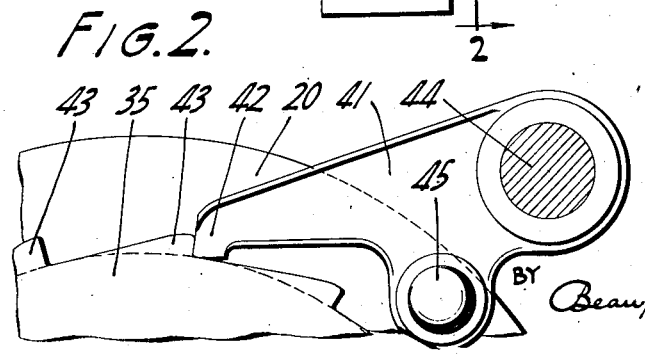
INVENTORS
HUMPHREY F. PARKER
ERFORD E. ROBINS
LOWELL B. GILBERT
BY Bean, Brooks, Buckley & Bean
ATTORNEYS Patented Aug. 3, 1943

2,325,917

UNITED STATES PATENT OFFICE 2,325,917

LOAD BRAKE

Humphrey F. Parker, Kenmore, Erford E. Robins, Tonawanda, and Lowell B. Gilbert, Kenmore, N. Y., assignors to Columbus McKinnon Chain Corporation, Tonawanda, N. Y., a corporation of New York Application June 28, 1941, Serial No. 400,328

5 Claims. (Cl. 192—16)

Our invention relates in general to load brakes and more particularly to the screw type friction brakes used upon hoists.

It is well known to those skilled in the art that the wheel part of a brake of this type is usually mounted upon and supported by the engaging screwthreaded parts of the device. For this reason it has been impossible heretofore to bring the working fit between these parts within the desired and necessary limits of tolerance, owing to the fact that the engaging screwthreaded parts cannot be accurately ground or machined without a prohibitive additional cost.

It has been the principal object of our invention to provide adequate and independent bearing support for the brake wheel on each side of the screwthreads so that the accuracy of the fit between the moving parts is not dependent upon the threads themselves, whereby the tolerances between the bearings may be made as limited as is desired without having to depend upon the accuracy of the screwthreads.

Moreover, our invention is so designed that the parts thereof may be easily machined and quickly and conveniently assembled.

Furthermore, our invention is of such nature that the bearings for the wheel may be conveniently ground and, therefore, may be hardened, adding very materially to the life of the hoist equipped therewith.

The above objects and advantages have been accomplished by the device shown in the accompanying drawing, of which:

Fig. 1 is a vertical sectional elevation of our invention taken on the vertical centerline thereof.

Fig. 2 is a fragmentary, sectional view thereof, taken on line 2—2 of Fig. 1, showing the ratchet pawl.

Fig. 3 is a reduced fragmentary view of a modified form of structure.

Our invention is applicable to hoists of the hand chain type or of the electrically operated type, and for illustrative purposes we have shown the invention as applied to the latter type of hoist.

In the drawing, 5 represents the shaft of the brake and 6 the brake wheel thereof. The shaft in the present case is provided with a pinion 10 which is connected in well known manner by suitable gearing to the drum or load-lift element of the hoist not shown in the drawing. Likewise, the brake wheel in the present instance is in the form of a spur gear 11 which is connected by suitable gearing (not shown) to the motive power, as for instance an electric motor (not shown).

The brake shaft 5 is formed with bearings 12 and 13 at its ends which are mounted, respectively, in anti-friction bearings 14 and 15 carried by the housing parts 16 of the hoist.

The shaft is provided with an integral friction disc 20 and with screwthreads 21. These screwthreads which are preferably of the Acme type and are formed upon the shaft in interspaced relation to the friction disc 20 provide the customary means of causing relative axial movement of the brake parts. A wheel bearing collar 22 is also formed on the shaft and is located adjacent the friction disc 20. The diameter of this collar is preferably equal to or slightly in excess of the outside diameter of the screwthreads 21 for reasons to be hereinafter described.

The shaft is also provided with a bearing collar 23 which is arranged adjacent to the screwthreads 21 and on the side thereof which is opposite the collar 22. The diameter of this collar is preferably slightly less than the bottom diameter of the screwthreads 21 so that it may be passed through the screwthreads 30 of the wheel. A screwthreaded portion 24 is formed on the shaft between the bearing 12 and the collar 23 for the reception of an adjusting nut 25.

The brake wheel 6 is provided with a hub portion 26 which is formed interiorly with the screwthreads 30 for engagement with the screwthreads 21 of the shaft. The hub is formed at the end adjacent to the friction disc 20 with a bearing 31 for engagement with the bearing collar 22. The opposite end of the hub is formed with a counterbore 32 which is slightly larger in diameter than the diameter of the bottoms of the threads 30. This permits the necessary clearance for the threading tool (not shown) when forming the threads 30. A bearing sleeve 33 is provided for bearing support of the collar 23 and this sleeve is pressed into the counterbore 32 of the wheel hub. The bearing surface 34 provided for the collar 23 by the sleeve may be fitted to the collar before assembly or the sleeve may first be pressed into the hub and then finished to size, preferably by grinding.

Since the surfaces of the collars 22 and 23 and the bearing surfaces 31 and 34 are cylindrical it will be obvious that they may be hardened and subsequently ground to size with and to any desired limits of tolerance. Because of our invention it will be obvious that the working fit between the screwthreads 21 and 30 need not be extremely accurate since no part of the bearing support of the brake wheel is taken by these threads and their only function is that of providing relatively axial movement of the wheel and the shaft.

Mounted between the gear wheel 6 and the friction disc 20 is the ratchet wheel 35 of our device which is formed on its periphery with suitable ratchet teeth 43. This ratchet wheel is of the type ordinarily employed upon brake devices of this type and each of its opposite sides is provided with suitable frictional faces 36. The engaging surfaces of the gear wheel and friction disc are of course accurately finished for engagement with the faces 36 of the ratchet wheel. The ratchet wheel is rotatably mounted upon the hub 26 of the gear wheel and a ratchet wheel bushing 40 is preferably pressed into the ratchet wheel and accurately fitted to the hub 26 for bearing engagement therewith.

A ratchet pawl 41 is provided having a pawl arm 42 for engagement with the teeth 43 of the ratchet wheel. This pawl is rotatably mounted upon a pawl shaft 44 which is suitably carried by the casing parts of our structure. This pawl is preferably of the centrifugal type and is provided with oppositely arranged spring-pressed frictional elements 45 which engage with friction surfaces of the gear wheel 6 and the friction disc 20. When the friction disc and wheel are rotated in counterclockwise direction as viewed in Fig. 2, the tendency of the friction elements to follow the movement of these parts will raise the pawl away from the teeth 43 of the ratchet wheel, thereby preventing the usual clicking sound and holding the pawl in such disengaged position until such time as the rotation is stopped and reversed, whereupon the same frictional contact with the surfaces will cause the arm 42 to be lowered and to engage with one of the ratchet teeth 43, thus preventing further rotation of the ratchet wheel and keeping the load sustained.

From the foregoing it will be obvious that the bearing surfaces of the shaft and the counterbored surfaces of the hub of the brake wheel may be conveniently machined and ground. After the counterbored surface 32 is finished to size, the bearing sleeve 33 may be pressed into place, after which both bearing surfaces 31 and 34 may be ground to accurately fit the bearing collars 22 and 23, respectively, with whatever working tolerances are desired.

The nut 25 is for the purposes of adjusting the amount of end motion of the brake wheel 6 upon the shaft and when properly adjusted may be locked in any desired way, as for instance by means of a cotter pin 46.

It is believed that the operation of this type of brake is well known and that only a brief description of operation is necessary. When the brake wheel 6 is rotated, in the present instance, in a counterclockwise direction as viewed from the left side of the figure, the hub 26 will be forced along on the shaft toward the friction disc due to the engaging screwthreads 21 and 30. The friction surfaces 36 will contact the engaging surfaces of the wheel and disc with sufficient force to cause the shaft to be rotated with the wheel, thus elevating the load. When rotation of the wheel is stopped, the ratchet pawl will maintain the ratchet wheel in locked position and sustain the load. When the gear wheel is now rotated in the opposite direction, as for instance in lowering the load, the frictional contact between the engaging parts is released to such a degree that the shaft will tend to rotate under the weight of the load being sustained by the hoist. As long as the friction between the engaging parts is released by the continued rotation of the wheel, the load will continue to descend. However, when rotation of the gear wheel is stopped, then further rotation of the shaft will cause the brake wheel to be drawn toward the friction disc and thereby cause sufficient friction to be reestablished to sustain the load and thus preventing relative rotation of the friction disc and ratchet wheel.

As shown in Fig. 3, the hub 50 of the wheel 51 may be formed at one end with a bearing surface 31 similar to the bearing surface of the principal form of the invention for bearing engagement with the bearing collar 22. The opposite end of the hub 50, however, in this form is provided with a bearing surface 53 which is of a diameter substantially equal to or slightly less than the diameter of the bottom of the thread 21 of the screw. The bearing surface 53 has direct bearing engagement with the collar 23 of the shaft 5. In this form of invention it is preferable to provide a counterbore 54 at the ends of the threads for convenient machining operations. A clearance groove 55 may also be provided in the shaft at this end of the screwthreads similar to the clearance groove 56 at the other end of the screwthreads and between said threads and the bearing collar 22.

Having thus described our invention, what we claim is:

1. A load brake for hoists comprising a brake shaft carrying a friction disc, a brake wheel mounted upon said shaft in spaced relation to said friction disc, a ratchet wheel mounted between said friction disc and said brake wheel and capable of frictional engagement with said last two mentioned elements, a fixedly arranged pawl for engagement with said ratchet wheel to prevent rotation thereof in one direction, non-supporting screwthread means between said shaft and said brake wheel for causing relative axial movement therebetween, and spaced bearings carried by said shaft and supporting said brake wheel on said shaft, said bearings being arranged one on each side of said screwthread means, whereby said wheel and the interior screwthreads formed therein are free of bearing support on the exterior screwthreads carried by said shaft.

2. A load brake for hoists comprising a brake shaft carrying a friction disc, a brake wheel mounted upon said shaft in spaced relation to said friction disc and having a hub, a ratchet wheel mounted between said friction disc and said brake wheel and capable of frictional engagement with said last two mentioned elements, a fixedly arranged pawl for engagement with said ratchet wheel to prevent rotation thereof in one direction, non-supporting screwthread means between said shaft and said brake wheel for causing relative axial movement therebetween, and spaced bearings carried by said shaft for the support of said brake wheel on said shaft, said ratchet wheel being in slidable and rotatable engagement with the hub of said brake wheel and arranged in substantial alignment with one of said bearings, said bearings being arranged one on each side of said screwthread means, whereby said wheel and the interior screwthreads formed therein are free of bearing support on the exterior screwthreads carried by said shaft.

3. In a load brake for hoists, the combination with the brake shaft, the brake wheel, the friction disc, and the ratchet means thereof, of non-supporting screwthread means between said shaft and said brake wheel for causing relative axial movement therebetween, and spaced bearings carried by said shaft and supporting said brake wheel on said shaft, said bearings being arranged one on each side of said screwthread means, whereby said wheel and the interior screwthreads formed therein are free of bearing support on the exterior screwthreads carried by said shaft.

4. A load brake for hoists comprising a brake shaft carrying a friction disc, a brake wheel mounted upon said shaft in spaced relation to said friction disc, a ratchet wheel mounted between said friction disc and said brake wheel and capable of frictional engagement with said last two mentioned elements, a fixedly arranged pawl for engagement with said ratchet wheel to prevent rotation thereof in one direction, screwthread means between said shaft and said brake wheel for causing relative axial movement therebetween, said wheel having a hub formed with an interspaced supporting surface at each side of screwthreads formed therein, each of said surfaces being of a diameter substantially equal to the outside diameter of the screwthreads spaced bearing collars of different diameters formed on said shaft and arranged one on each side of the screwthreads formed thereon, the larger of said collars having a diameter substantially equal to the supporting surface at one end of the hub for bearing engagement therewith, the smaller bearing collar having a diameter substantially equal to the diameter at the bottom of the thread, and a bearing sleeve carried by the supporting surface of the hub which is adjacent the smaller collar of the shaft and having bearing engagement therewith, whereby said collars support said wheel and the interior screwthreads formed therein free of bearing support on the exterior threads carried by said shaft.

5. A load brake for hoists comprising a brake shaft carrying a friction disc and supported at each end in an independent shaft bearing, a brake wheel mounted upon said shaft in spaced relation to said friction disc, a ratchet wheel mounted between said friction disc and said brake wheel and capable of frictional engagement with said last two mentioned elements, a fixedly arranged pawl for engagement with said ratchet wheel to prevent rotation thereof in one direction, non-supporting screwthread means between said shaft and said brake wheel for causing relative axial movement therebetween, and spaced wheel bearings carried by said shaft and supporting said brake wheel on said shaft, said wheel bearings being arranged one on each side of said screwthread means, whereby said wheel and the interior screwthreads formed therein are free of bearing support on the exterior screwthreads carried by said shaft.

HUMPHREY F. PARKER.
ERFORD E. ROBINS.
LOWELL B. GILBERT.